(12) United States Patent
Keskar

(10) Patent No.: US 6,832,242 B2
(45) Date of Patent: Dec. 14, 2004

(54) SYSTEM AND METHOD FOR AUTOMATICALLY SHARING INFORMATION BETWEEN HANDHELD DEVICES

(75) Inventor: Dhananjay V Keskar, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 879 days.

(21) Appl. No.: 09/750,556

(22) Filed: Dec. 28, 2000

(65) Prior Publication Data

US 2002/0087632 A1 Jul. 4, 2002

(51) Int. Cl.[7] .............................................. G06F 15/16
(52) U.S. Cl. ........................ 709/204; 709/213; 707/201
(58) Field of Search ............................... 709/204, 213, 709/248; 707/201

(56) References Cited

U.S. PATENT DOCUMENTS

2002/0023230 A1 * 2/2002 Bolnick et al. .............. 713/202
2002/0032791 A1 * 3/2002 Isherwood et al. ......... 709/230
2002/0065883 A1 * 5/2002 Lunsford et al. ........... 709/204

* cited by examiner

Primary Examiner—Krisna Lim
(74) Attorney, Agent, or Firm—Sharmini N. Green (57) ABSTRACT

A system and method for automatic relevance-base sharing information between handheld devices are provided. A centralized location stores interest profiles of a plurality of users of handheld devices. A profile agent and a sharing agent in a computing device obtain, from the centralized location, a list of users with profiles similar to the profile of a user operating the computing device and mark sharable items of such user with users to whom the item is relevant. The synchronizer synchronizes the list and the marked sharable items to the handheld device of the user operating the computing device. The logic embedded in the handheld device allows automatic relevance-based sharing of items between the handheld device and other handheld devices.

37 Claims, 6 Drawing Sheets

User A: relev=3, handheld=3, shar=3, palm=2, automat=1, wireless=1, election=-1, kosovo=-1, clinton=-2, recount=-3

User B: pe=3, stock=3, split=2, index=2, market=2, nasdaq=2, djia=2, russell=1, election=-1, bush=-1

Figure 4

SimilarUsers table 136a

| UserID | SimlarityScore |
| --- | --- |

Items table 136b

| ItemID | Type | Location |
| --- | --- | --- |

ItemInterest table 136c

| ItemID | UserID | InterestLevel |
| --- | --- | --- |

SYSTEM AND METHOD FOR AUTOMATICALLY SHARING INFORMATION BETWEEN HANDHELD DEVICES

BACKGROUND OF THE INVENTION

1. Field of the Invention

The present invention generally relates to handheld devices, and in particular, to systems and methods for automatically sharing user-relevant information between handheld devices, such as personal digital assistants (PDAs) and combination phone/computer devices.

2. Related Art

Handheld devices, in particular PDAs, are used widely to facilitate users in organizing business and personal appointments, contacts, to-do list items, memos, expense reports, etc. Recent palm-size PDAs are also equipped with document readers and mini-web browsers to display additional reading material on the PDAs. The document readers may, for example, be useful for reading books and mails. Mini-web browsers allow users of the PDAs with online connection capability to roam the Internet and extract information from the Internet. Other popular handheld devices include small personal organizers, palm-size computers, and combination phone/computer devices. Many of the handheld devices also have the ability to synchronize with a desktop computer, utilizing either a synchronizer connected to the desktop computer or some sort of wireless protocol.

Currently, most handheld devices, in particular PDAs, support a "beaming" utility, which allows for quick, easy, and wireless sharing of selected items between handheld devices in close proximity. Beaming is usually performed between two parties, a sender and a recipient. Typically, the sender would have an assortment of items on his/her PDA, one or some of which are of interest to the recipient. Some examples of the popular items are offline web pages, e-books, game applications, system applications, and utility applications. Common data, such as contacts, appointments, mail, to-do list items, memos and notes, are also found in most PDAs.

To make the sharing work using conventional sharing technology, the sender usually acts as the initiator and describes the items on his/her PDA to the recipient. The recipient may then express an interest in one or some of the items. The recipient can also act as the initiator and expresses his/her interest in certain items by inquiring to the sender whether the sender has the item(s) on the sender's PDA. Upon establishing that a particular item owned by the sender is of interest to the recipient, and assuming that the sender does not object to the transfer of the item, the sender proceeds to "beam" the item of interest to the recipient from his/her PDA. At this point, the recipient makes sure that his/her PDA is in the "beam receiving" mode. Upon receiving the beamed item(s), the recipient's PDA accepts it and allocates it to the appropriate location on the PDA.

In conventional sharing technology, it is necessary for users of the handheld devices to personally keep track of all the information and items they carry on their handheld devices because they could potentially be senders who beam items to recipients. Due to recent technology advances, available memory of a handheld device has increased. More and more items are being stored on the handheld devices for offline access. This makes it difficult for users to remember all the items they carry on their handheld devices. A sender not only needs to remember to mention items or offer them to others to whom the items may be relevant, but the sender also needs to remember that he/she has certain items relevant to a particular person when asked by the particular person. Although a recipient could inquire and personally ask a sender a question as to whether he/she has a particular item or type of item, the conventional beaming technology and the limited function of the present software applications on the handheld devices do not allow the recipient to actually initiate the sharing of information between the recipient and the sender through a beaming process. Moreover, a sender may not be aware of all the interests of a recipient, even though the sender has information and/or an item pertaining to a person with such interests and would have offered the information and/or item to the recipient if the sender had been aware of the interests of the recipient.

Invariably, using the conventional technology, before beaming is to start, there is always the need for either a sender to personally mention or offer an item to a recipient, or a recipient to personally ask a sender for an item. There is no automatic way of sharing information that is relevant to the recipient from a handheld device. Therefore, there is a need for a system and method that allows users of handheld devices to automatically share user-relevant information between handheld devices. The system and method should take into consideration the limited processing power of the handheld devices, the limited nature of the "beaming" protocol, and the limited controllability of the handheld devices due to the limited customization of native software applications.

DETAILED DESCRIPTION

Figure 1:
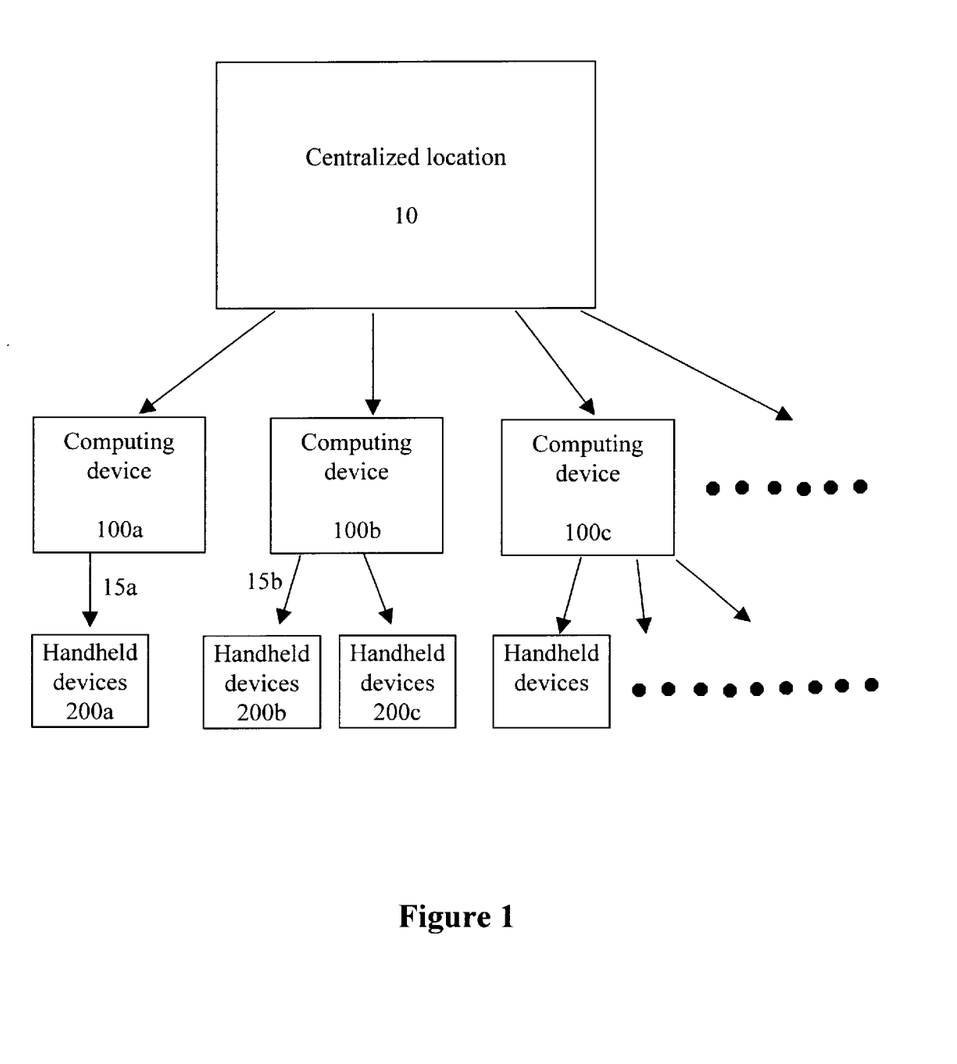
FIG. 1 illustrates an environment having a centralized location, computing devices and handheld devices in which embodiments of the present invention may function.

FIG. 1 illustrates an environment comprising a centralized location, computing devices and handheld devices in which embodiments of the present invention may function. The centralized location 10 interacts with a number of computing devices, including computing devices 100a–100c. Each computing device further interacts with a handheld device or a number of handheld devices. In FIG. 1, the computing device 100a interacts primarily with only one handheld device 200a, while the computing device 100b interacts with two handheld devices 200b, 200c.

In one embodiment, the centralized location 10 accepts and stores, among other things, interest profiles of the users subscribed to the centralized location 10 to share the interest profiles. The centralized location is also able to process the interest profiles shared by the users and to detect users with similar interest profiles. A list of users with similar interest profiles is provided to any computing device on demand. The computing devices 100a–100c are, in general, electronic devices with high processing power and storage capacity, allowing them to perform complex algorithms and sophisticated programs. Theses computing devices 100a–100c serve as platforms for users to interact with the centralized location, such as sending data to, and receiving information from, the centralized location 10. The computing devices 100a–100c also serve as the locations for creating databases that allow automatic sharing of user-relevant information between handheld devices. For example, two users, user A and user B, may wish to have "automatic sharing" databases created. Based on inputs from users A, B and information from the centralized location 10 pertaining to users A, B, automatic sharing databases corresponding to users A, B are created. User A may, for example, operate computing device 100a, while user B operates computing device 100b. In this case, the computing device 100a creates an automatic sharing database that corresponds to user A, and the computing device 100b creates an automatic sharing database that corresponds to user B. In another implementation, users A, B may also operate the same computer device but at different times, with user A's automatic sharing database being created in time T1 and user B's automatic sharing database being created in time T2.

Through synchronizers, the automatic sharing databases of users A, B are synchronized from the computing devices 100a, 100b to the handheld devices of users A, B, respectively. The handheld devices of user A and user B may, for example, be handheld device 200a and handheld device 200b in FIG. 1, respectively. In general, a handheld device, such as handheld device 200a, is considered to have low processing power and limited storage capacity as compared to a computing device, such as the computing device 100a. The handheld devices 200a, 200b interact with their respective computing devices 100a, 100b through links 15a, 15b. The links 15a, 15b could be a wire-based communication line or a wireless communication line. For example, sophisticated wireless protocols, such as Bluetooth and other short wave radio links, can be utilized to allow the computing devices 100a, 100ba to interact with wireless handheld devices or wireless phone/computer devices.

Upon receiving their respective automatic sharing databases, the handheld devices 200a, 200b store the databases in their memory. Each automatic sharing database contains the information necessary for the corresponding handheld device to engage in automatic sharing of user-relevant information between handheld devices. In one implementation, the automatic sharing database includes a database of items with a list of users interested in the items. In another implementation, the automatic sharing database includes a list of users with similar interest profiles. In yet another implementation, the automatic sharing database includes both a number of items with a list of users interested in the items and a list of users with similar interest profiles.

The automatic sharing database is utilized by user A when he/she wishes to automatically share information from the handheld device 200a to user B's handheld device 200b, or other handheld devices operated by other users subscribed to the centralized location. In one implementation, user A, as a recipient, initiates sharing between the handheld device 200b of user B and the handheld device 200a of user A. During the sharing, user B, as a sender, queries its automatic sharing database for items relevant to user A, the recipient. The basis of the query may, for example, be user A's identification information. The item(s) returned as the result of the query are accessed and beamed to the recipient. In another implementation, user A, as a sender of an item(s), initiates sharing between the handheld device 200a of user A and the handheld device 200b of user B. The item(s), along with user A's identification information, are beamed toward the handheld device 200b of user B. The user B, as a recipient, queries its automatic sharing database using user A's identification information to see if user A has similar interests. Upon finding that user A has similar interests, the handheld device 200b of user B accepts the beamed item.

Figure 2:
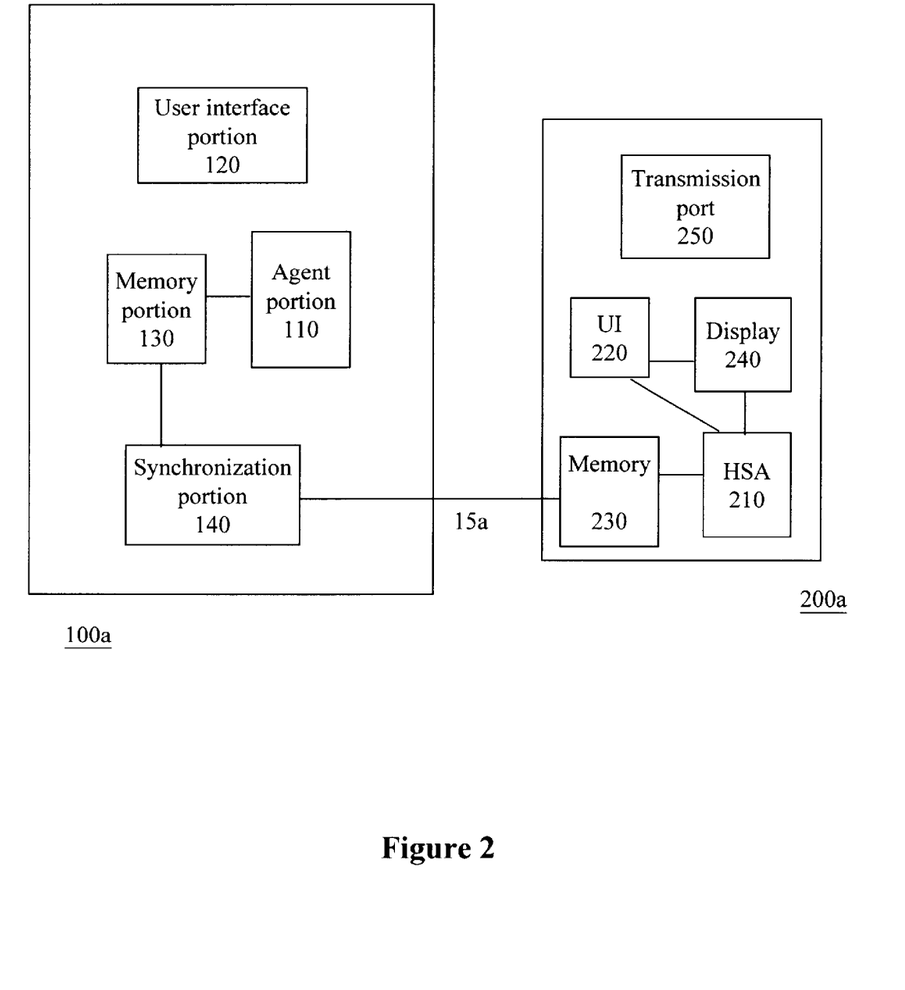
FIG. 2 shows in more detail one of the computing devices and one of the handheld devices of FIG. 1 according to an embodiment of the present invention.

FIG. 2 shows in more detail one of the computing devices and one of the handheld devices of FIG. 1 according to an embodiment of the invention. In this illustrative example, the computing device 100a and the corresponding handheld device 200a are shown. Both devices 100a, 200a are operated by user A. The computing device 100a includes an agent portion 110, a user interface portion 120, a memory portion 130, and a synchronization portion 140. The memory portion 130 stores, among other things, shareable items to be synchronized to the handheld device 200a and a share information database, or the aforementioned automatic share database. In the preferred embodiment, the agent portion 110 comprises a number of agents, including a profile agent and a sharing agent. The profile agent maintains user A's interest profile and provides support for finding profiles with similar interests. In one embodiment, user A operates the user interface portion 120 to edit his/her own interest profile. The interface portion 120 also allows user A to select items and make them shareable with others from the handheld device 200a. After such selection, the sharing agent analyzes the items, along with their content, and determines a list of other users who are interested in the items.

Essentially, in the preferred embodiment, through the user input from the user interface portion 120 and the work of the agent portion 110, similar user information and share user information are gathered. The similar user information includes a list of users with interest profiles similar to that of user A. The share user information includes a database of items and the list of users interested in the items. Together, the similar user information and share user information are stored in the memory portion 130. Both pieces of information preferably reside in a share information database (SIDB) in the memory portion 130. In one embodiment, the SIDB is updated whenever the computing device 100a interacts with the centralized location 10 and new similar profiles or new relevant users are found by the agent portion 110. A new similar profile and/or new relevant user potentially exists whenever a new user subscribes to the centralized location 10 and stores his/her interest profiles in the centralized location 10. When old similar profiles or old relevant users are deleted, the SIDB is similarly updated. The SIDB is also updated if there is a change in some user's profile. User A, either through the user interface portion 120 on the computing device 100a or the user interface 220 on the handheld device 200a, may also update the SIDB. User A may manually add, delete, or otherwise modify the similar user information or the share user information. In another embodiment, user A may set a filter, or filters, to prevent particular types of similar profiles or types of relevant users from forming, or to prevent particular items from being shared.

During synchronization between the computing device 100a and the handheld device 200a, the share information database is transferred from the computing device 100a to the handheld device 200a through a communication link 15a. Synchronization is accomplished through the synchronization portion 140 and transfer protocols recognized by both the computing device 100a and the handheld device 200a, which may be wire-based or wireless. Software programs run on both the computing device 100a and the handheld device 200a also facilitate synchronization. In one embodiment, the synchronization portion 140 does not reside in the computing device 100a. Instead, the synchronization portion 140 is an external device that is connected to the computing device 100a and provides a platform on which the handheld device 200a sits during synchronization. In addition to the share information database, according to an embodiment of the present invention, items to be synchronized to the handheld device 200a are also transferred to the handheld device 200a during synchronization. These items may, for example, be sharable items to be synchronized (if they have not already been included in the SIDB) and non-sharable items to be synchronized.

As shown in FIG. 2, the handheld device 200a includes, among other things, a handheld sharing application portion 210, a user interface portion 220, a memory portion 230, a display portion 240, and a transmission port portion 250. The memory portion 230 stores, among other thing, the SIDB transferred from the computing device 100a. In one embodiment, the user interface portion 220 is integrated with the display portion 240 because user interfaces are displayed on the display portion 240. In other embodiments, user interfaces are provided separately from the display portion 240, or provided both in and separately from the display portion 240. The handheld sharing application portion 210 runs on the handheld device 200a. In a preferred embodiment, the user interface portion 220 provides user interface mechanisms to allow user A to initiate automatic sharing or respond to an automatic sharing beaming request, either as a recipient or a sender. During automatic sharing, the handheld sharing application portion 210 uses the similar user information and share user information in the memory portion 230 to either query for relevant items or asks whether similar interests exist. Sometimes, the relevant items are not on the handheld device 200a but are items residing in the computing device 100a or other location. In such case, the display portion 240 may display notes indicating the location of the items and/or provide an option for the items to be synchronized to the handheld device 200a during the next synchronization session, and then shared with another handheld device. After finding the relevant items or deciding that similar interests exist, the handheld sharing application portion 210 either causes the relevant items to be accessed and beamed from the transmission port portion 250 to another handheld device acting as a recipient or accepts/rejects the relevant item from another handheld device acting as a sender.

Figure 3:
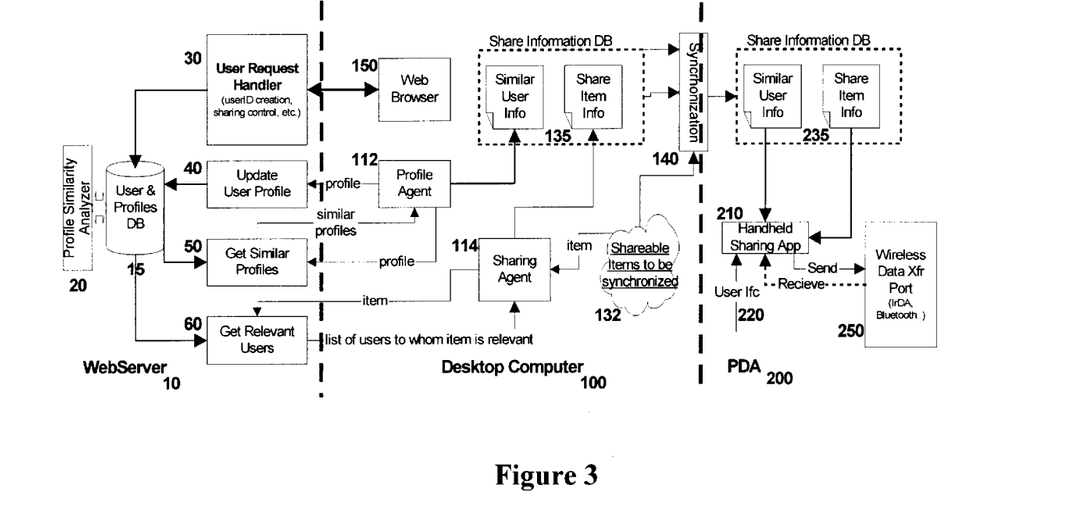
FIG. 3 shows a system for automatically sharing user-relevant information between handheld devices according to an embodiment of the present invention.

FIG. 3 shows a system for automatically sharing user-relevant information between handheld devices according to an embodiment of the present invention. The system is divided into three sections: a centralized location section, a computing device section, and a handheld device section. In the preferred embodiment, the centralized location is a web server 10. The computing device section comprises a number of desktop computers, including a desktop computer 100 shown in FIG. 3. The handheld device section comprises a number of handheld devices, including a PDA 200. The computing device section could also be other kind of personal computers, such as a laptop computer, or another server. Data between the web server 10 and the desktop computer 100 are transmitted through an Internet connection. The Internet connection may, for example, be a phone line, a network communication link, a wireless communication link, a cable modem line, or a digital subscriber line. Various items are transferred between the web server 10 and the desktop computer 100, including basic user information, data pertaining to the web browser, interest profiles, similar interest profiles and/or related information, sharable items or notes to be synchronized to the handheld device section, and a list of users to whom the sharable items or notes is relevant. In one embodiment, to prevent data transferred between the web server 10 and the desktop computer 100 from being eavesdropped or tampered, a secure link is established between them. Public-key cryptography and/or a digital certificate may, for example, be used to establish the secure link.

In the preferred embodiment, the web server 10 includes a users and profiles database 15, a profile similarity analyzer 20, and functionality for updating and extracting information from the database 15. In one implementation, the functionality comprises a user request handler 30, an update user profile portion 40, a get similar profile portion 50 and a get relevant users portion 60. The users and profiles database 15 stores user information and user interest profiles. The user information is input into the users and profiles database 15 through the user request handler 30. The user request handler 30 provides the support for a user to subscribe and obtain access to the web server 10. The user may also unsubscribe the use of the web server 10 through the user request handler 30. Initially, a user must choose a unique user identification (UserID) and a password, which the user can use to access the web server 10. In one implementation, the user chooses a unique UserID and password in a fashion similar to choosing any portal identification through a signup page. Along with information related to UserID, the user may also enter user account information, such as the address or contact information of the user. Through the user request handler 30, sharing control information may also be entered to establish certain controls when automatic sharing is to be conducted with a particular user. For example, the user may wish to establish filters to block certain users, certain types of users, and/or certain items from being associated with the user or the user's interest profiles. As the UserID information, the user account information (if provided) and the sharing control information (if provided) are entered, they are stored in the users and profiles database 15.

In the web server 10, the update user profiles portion 40 accepts interest profiles of users from various computers, including the desktop computer 10. The users are, in general, those who subscribed to the web server 10. After the interest profiles are accepted by the update user profiles portion 40, the interest profiles are stored at specific locations in the users and profiles database 15. Situations may arise whereby a particular user wishes to update his/her interest profile, which was previously stored in the users and profiles database 15. The user may either enter a new interest profile or enter only the new changes to the previously stored interest profile. In one implementation, the update user profiles portion 40 receives the new interest profiles or the new changes. After comparing the new interest profiles or the new changes with the previously stored interest profiles, the update user profiles portion 40 makes the appropriate modifications to the previously stored interest profiles to incorporate new additions to the previously stored interest profiles. In another implementation, the update user profiles portion 40 simply replaces the previously stored interest profiles with new interest profiles.

Like the update user profiles portion 40, the get similar profiles portion 50 also receives interest profiles. As its name indicates, the get similar profiles portion 50 receives interest profiles to determine the similarity between interest profiles and make a note of such similarity. The get similar profiles portion 50 receives interest profiles from both the desktop computers and the users and profiles database 15. The interest profiles from the desktop computers are the interest profiles of the users using the desktop computers. The interest profiles from the users and profiles database 15 are the interest profiles shared by all users ("shared interest profiles"). In one implementation, after receiving a user's interest profile from a desktop computer, the get similar profiles portion 50 makes a query to the users and profiles database 15 using the user's interest profile. Based on the query, a similarity score is assigned for each of the shared interest profiles. Information regarding the shared interest profiles with a high similarity score is then extracted. The information may, for example, be a UserID. Similarity indicators, such as similarity scores, may also be assigned between similar shared interest profiles within the users and profiles database 15. Such assignment is performed by the profile similarity analyzer 20. This allows searches to be accomplished in a faster manner because once a similar interest profile is found, interest profiles similar to that interest profile may be quickly found based on the similarity indicators. In another implementation, the get similar profiles portion 50 processes interest profiles, both share interest profiles and a user's interest profile, and finds users with similar interest profiles based on at least one of shared scopes. Illustrative examples of the shared scopes are public, specified group of users, and specified categories of interest. Upon finding users with high similarity scores or similar interest profiles, a list of users is generated. This list of users may, for example, be in terms of UserIDs, and it is provided to any of the desktop computer upon demand. In this example, the desktop computer upon demand is the desktop computer that provided the user's interest profile.

The get relevant users portion 60 functions in a similar fashion as the get similar profiles portion 50. However, instead of receiving user's interest profiles from the desktop computers, the get relevant users portion 60 receives items or information pertaining to the items from the desktop computers. These items are generally sharable items selected by users using the desktop computers. In one implementation, a query is made into the users and profiles database 15 using the content in a sharable item or a set of sharable items. The query checks for any interest profile that is relevant to the content and the degree of relevance. In one implementation, keyword matches and number of reoccurrence of the keywords may, for example, be utilized. In other implementation, the subject field or the author field may be utilized. The result of the query returns a list of users to whom the sharable item or the set of sharable items is relevant. This list is provided to any of the desktop computers on demand. In this example, the desktop computer upon demand is the desktop computer that provided the content of the sharable item or the set of sharable items.

The desktop computer 100 shown in FIG. 3 represents a type of computing device that interacts with the web server 10 and the PDA 200 to allow automatic sharing between handheld devices. In a preferred embodiment, the desktop computer 100 includes a web browser 150, a profile agent 112, a sharing agent 114, sharable items or notes to be synchronized 132, a share information database 135, and a synchronizer 140. The web browser 150 allows a user using the desktop computer 100 to interact with the web server 10. Illustrative examples of a web browser 150 are Microsoft Corporation's Internet Explorer and Netscape Communications Corporation's Netscape Navigator/Communicator. Through the web browser 150, a user utilizing the desktop computer 100 may access the web server 10, sending information to and receiving information from the web server 10. For example, the user may access the signup page to subscribe to the web server 10. The user may access the account page to enter or modify account information or control/restrict information, interest profiles, etc. From the desktop computer, this information is usually sent to the user request handler 30 or the update user profile portion 40 of the web server 10.

The profile agent 112 maintains the interest profile of the user operating the desktop computer 100. Various techniques may be used to create and organize the interest profile. For example, the interest profile may be based on keywords, keyword phrases with Boolean operators, vector space models, or other techniques commonly known by those skill in the art. In one implementation, the profile agent 112 allows the user to enter and/or edit the interest profile from the desktop computer 100. For example, the user may be asked to answer questions or fill out a survey. Based on the answers given by the user, the interest profile for the particular user is created. In another implementation, instead of having the user enter information pertaining to interest profiles, the profile agent 112 use desktop monitoring and user context deductions to build the user's interest profile. In one implementation, the interest profile is automatically built by the profile agent 112 using various monitoring and context deduction criteria. The criteria may be pre-stored on the computing device 100, determined by the desktop computer 100 as a user operates it, and/or entered by the user. For example, the computing device 100, through its profile agent 120, may analyze the kind of items previously stored on the computing device 100 and/or the handheld device 200, the kind of new items being stored by the user in either device, and/or the type of web pages visited by the user. The items may, for example, be documents, files, mail, to-do list items, memoranda, figures, pictures, web page history, and appointments. Based on relevance between the items, keyword matches, and context deduction, the interest profile is created. The interest profile created by the user is sent to the update user profile portion 40 in the web server 10, where the users and profiles database is updated with the user's interest profile. For example, a user may send his/her interest profile to the web server 10, specifying whether to share it publicly or only with some specified users or types of users.

The profile agent 112 also provides support for finding profiles with similar interests. It functions closely with the get similar profiles portion 50. In one implementation, the profile agent 112 sends the interest profile created by the user operating the desktop computer 100 to the get similar profiles portion 50. The profile agent 112 asks for and accepts from the web server 10 a list of users with interest profiles similar to the interest profile of the user operating the desktop computer 100. In one implementation, the profile agent 112 further accepts the interest profiles or information pertaining to the interest profiles along with the list. The interest profiles of the users with similar interest profiles, or information pertaining to them, affords the profile agent 112 the ability to find out if an item is of interest to a particular user based on that user's interest profile. Thus, interest level in, for example, a particular sharable item or sharable note may be determined.

Figure 4:
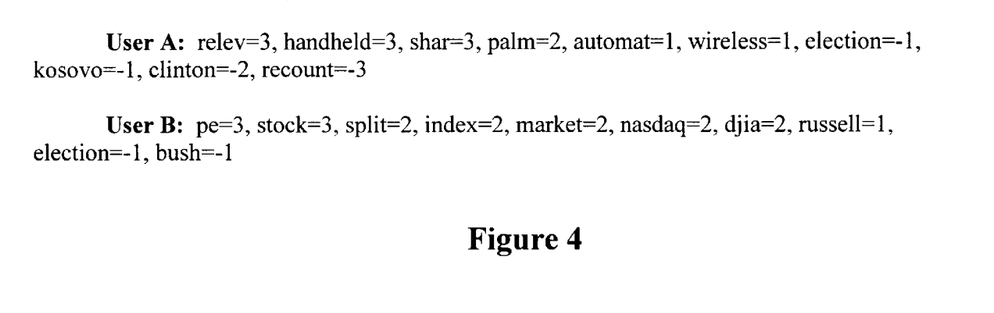
FIG. 4 depicts an illustrative example of an interest profile based on Salton vectors according to an embodiment of the present invention.

In an illustrative example, the interest profiles are established on the basis of a vector space model for information retrieval. More specifically, Salton vectors are utilized. FIG. 4 depicts an illustrative example of an interest profile based on Salton vectors according to an embodiment of the present invention. In Salton vectors, documents/items are modeled as vectors in a high-dimensional space of many terms, which can be in the thousands. The terms are derived from words and phrases in the documents and are weighted by their importance within the document and within the corpus of documents. Each document's vector seeks to represent the document in a vector space, allowing comparison with vectors derived from other sources, e.g., queries or other documents. Interest profiles based on Salton vectors essentially combine as a document, terms or phrases that are preferred by users. In one implementation, they also include with negative weights, terms or phrases that the user does not like. These terms and phrases in turn can be obtained from individual "documents" that a user likes or dislikes. The number of weighted term contained in a Salton vector based interest profile is usually large, too numerous to list here. However, simple forms of them are illustrated in FIG. 4 as a number of "convention term=weight" pairs. As shown in FIG. 4, user A is a person who is interested in handheld sharing but not interested in elections, with conventional terms like "relevance," "handheld," "sharing" being positively weighted and conventional terms like "election," "clinton," "recount" being negatively weighted. On the other hand, user B is a person who is interested in stock market news, with conventional terms "pe (price earning)," "stock," "split," "nasdaq" being highly and positively weighted.

Besides the profile agent 112, the desktop computer also includes the sharing agent 114. The sharing agent 114 allows the user operating the computer device 100 to select items and make them sharable with others from the PDA 200. In this example, the items selected by the users are the sharable items 132 to be synchronized to the PDA 200, and these items are first created or available in the desktop computer 100. In other embodiments, an item may also be first created on the PDA 200. In those cases, the user of the PDA 200 can designate the item as sharable, and then synchronize to the desktop computer 100 as a part of sharable items 132 to be processed by the sharing agent 114. Before the next synchronization is to take place between the desktop computer 100 and the PDA 200, the sharing agent 114 scans and process the various sharable items 132, analyzes their content, and queries the web server 10 for a list of users who might be interested in the content.

The sharable items 132 on the desktop computer 100 may, for example, include mail messages, non-executable files (word processing documents, spreadsheets, slides, pictures, etc.), executable files, web pages being browsed, contact information, and common data found on a palm-size PDA. The common data found on a palm-size PDA may, for example, include memos, to-do list items, calendar/appointment items, as well as notes fields that corresponds to the aforementioned examples. The notes fields provide additional information relating to the aforementioned examples. In some instances, due to the limited storage capability of the PDA 200, some sharable items 132 are processed by the sharing agent 114 but not subsequently synchronized to the PDA 200 in the next synchronization session. Instead, sharable notes are synchronized to the PDA 200 in place of those sharable items, and the sharable items are only synchronized in a synchronization session subsequent to it being requested for automatic sharing.

In the embodiment, the sharing agent 114 interacts with the get relevant users portion 60 of the web server 10. The sharing agent 114 sends the content, or other information pertaining to the sharable items 132, to the get relevant users portion 60. Based on the content or other information, the get relevant users searches the users and profiles database 15 and returns a list of users to whom the sharable items 132 is relevant. In another embodiment, the sharing agent 114 uses the similar interest profiles received by the profile agent 112 to determine the list of users to whom the items is relevant. The interest profiles stored in the users and profiles database 15 and the similar interest profiles received by the profile agent 112 contain interest profile information for users subscribed to the web server 10 and those users with interests similar to the user operating the desktop computer 100, respectively. The information is used to determine the interest level in a particular item, creating a list of users to whom the item is relevant. There are several techniques for carrying out these two embodiments efficiently. For example, Salton vectors may be compared with each other for relevance, essentially measuring how close the document vectors are in the informational space. Since the interest profile may also be treated either as a vector or a document, any document/item can be compared with the interest profile to see whether the item is close to the interest profile, and thus of interest or relevant to other users. If the interest profiles are stored in a database, a query can be made based on the terms in the items, with the relevance being computed based on common terms between the items and the interest profiles as well as their relative weight. In the case where keyword based interest profiles are used, a search for matching words or terms between the items and the interest profiles in question is performed.

As the profile agent 112 and the sharing agent 114 receive their requested information, respectively, from the web server 10 or the other agents on the desktop computer 100, they add appropriate entries to the share information database (SIDB) 135. The profile agent 112 creates and sends similar user information to the SIDB 135. In one implementation, the similar user information comprises a list of users with interest profiles similar to the user operating the computer desktop 100 and the similar interest profiles themselves, or information pertaining to them. The sharing agent 114 creates and sends share user information to the SIDB 135. In one implementation, the share user information comprises the sharable items 132, their locations, and the list of users interested in, or relevant to, the sharable items 132. The list of users may, for example, be in terms of UserIDs. In another implementation, the sharable items 132 are separately and/or selectively synchronized to the PDA 200, and the share user information includes only the list of users interested in, or relevant to, the sharable items 132.

Figure 5:
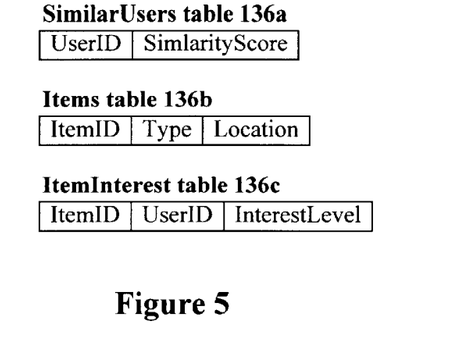
FIG. 5 depicts an illustrative example of the structure of entries in a share information database according to an embodiment of the present invention.

The database scheme for the SIDB 135 need not be complex. The share information database 135 simply maintains the similar user information and the share user information that have already been deduced by the profile and share agents 112, 114. FIG. 5 depicts an illustrative example of the structure of entries in a SIDB 135 according to an embodiment of the present invention. In the example, the share information database 135 includes a similar users (SimilarUsers) table 136a, an Items table 136b and an item interest (ItemInterest) table 136c. The SimilarUsers table 136a lists users with interest profiles similar to that of the user operating the desktop computer 100. As shown in FIG. 5, an entry of the SimilarUsers table 136a includes a UserID field and a SimilarityScore field. The UserID field identifies a user who has similar interests as the user operating the desktop computer 100. The corresponding SimilarityScore filed indicates the degree of similarity between the interest profile of the user identified by the UserID field and the user operating the desktop computer 100. The Items table 136b stores information pertinent to describing sharable items that are relevant to other users. In another implementation, information pertinent to describing items that are not immediately, but are later, sharable are also included. As shown in FIG. 5, an entry in the Items table 136b may, for example, include a ItemID field for denoting an item, a Type field for describing the type of the item, and a Location field for indicating the location of the item. The ItemInterest table 136c lists users, in terms of UserID, who are interested in the sharable items. As shown in FIG. 5, an entry in the ItemInterest table 136c may, for example, include an ItemID field for denoting an interested item, a UserID field for denoting a particular user, and an InterestLevel field for indicating the interest level of the particular user in the interested item.

Referring to FIG. 3, during synchronization, the SIDB 135, along with the sharable items 132 to be synchronized (if they are not already included in the SIDB 135), are synchronized to the PDA 200. The UserID of the owner of the PDA 200, which presumably is the user operating the desktop computer 100, is also sent to the PDA 200 during synchronization. In the first synchronization between the desktop computer 100 and the PDA 200, the SIDB 135 is simply transferred from the desktop computer 100 to the PDA 200 and maintained on the PDA 200 in the same form. In subsequent synchronization, other methods may be implemented for transferring the SIDB 135. In one embodiment, only new additions to the SIDB 135 are transferred to the PDA 200. In another embodiment, the old SIDB 235 on the PDA 200 is simply overridden by the new SIDB 135 from the desktop computer 100. In yet another embodiment, the SIDB on the desktop computer 100 is compared with the one on PDA 200 to determine the new additions to the two SIDBs 135, 235 and to incorporate those new additions in both SIDBs. Preferably, there is provided a selection mechanism to allow a user to choose whether the desktop computer 100 is to override the PDA 200, the PDA 200 is to override the desktop computer 100, or the two sections 100, 200 are to work together to incorporate new changes during synchronization. Since the SIDB 135, or a portion thereof, to be transferred, contains similar user information and share user information that have already been deduced by agents on the desktop computer 100, the actual synchronization is not slowed by having the desktop section 100 determine the information then.

The PDA 200 includes a handheld sharing application (HSA) 210 and, after synchronization, the SIDB 235 and the sharable items 132 to be synchronized to the PDA 200. The PDA 200 also includes a data transfer port 250 that allows for the transmission or reception of items to be shared. In one embodiment, a user interface front end is provided for the SIDB 135 and/or the SIDB 235. The user interface front end may be available in the desktop computer 100 and/or the PDA 200. The user interface front end depicts similar user information and share user information stored in the SIDB 135 or SIDB 235 and allow users to modify them. This may also allow a user to set the information as he/she desires and specify rules for making the information.

After receiving the SIDB 235, the HSA 210 that runs on the PDA 200 utilizes the SIDB 235 upon demand. The HSA 210 is a program, or a number of programs, which provides the functionality and the interface to allow automatic sharing of relevant information between the PDA 200 and other handheld devices. The interface provide by the HSA 210 is termed as HSA user interface (HSA UI) 220 in FIG. 3. In the preferred embodiment, the HSA 210 queries the SIDB 235. This query is based on either a recipient's user identification information or a sender's user identification information, depending on whether the user of PDA 200 initiated automatic sharing as a recipient or a sender.

When the user of the PDA 200 initiates automatic sharing of an item as a recipient of that item from a sender, the HSA 210 of the sender for the automatic sharing searches through sender's SIDB 235 for UserID(s) that match the UserID of the user of the PDA 200 in the ItemInterest table 136c. The corresponding ItemID field in every entry that contains a matching UserID designates an item to be returned from the query. Similarly, the corresponding InterestLevel field indicates the particular interest level of that item. In one implementation, a user may set a filter to prevent an item from being automatically shared if the item is below a certain interest level. The items returned from the query of the sender's SIDB 235 are then accessed and beamed from the sender to the PDA 200 and received by the PDA 200 through the data transfer port 250. The protocols used for the data transfer may, for example, be low-range wireless communication protocols such as Infrared data and Bluetooth. This allows a sender to easily and automatically send only those items, which are of interest to a recipient, and only to those recipients with similar interests.

On the other hand, when the user of the PDA 200 initiates automatic sharing of an item as a sender of that item to a recipient, the HSA 210 of the recipient for the automatic sharing searches through recipient's SIDB 235 for a UserID that matches the UserID of the user of the PDA 200 in the SimilarUsers table 136a. Upon finding a matching UserID, the HSA 210 of the recipient discerns whether the sender and the recipient have similar interests by looking at the corresponding SimilarityScore field in the entry containing the matching UserID. Assuming that the HSA 220 of the recipient is satisfied with the degree of similarity, the item sent/beamed by the user of the PDA 200, as the sender, through the data transfer port 250 is accepted by the recipient. This allows a recipient to easily know whether a sender has similar interests and use this information to decide whether to accept the beamed items.

Figure 6:
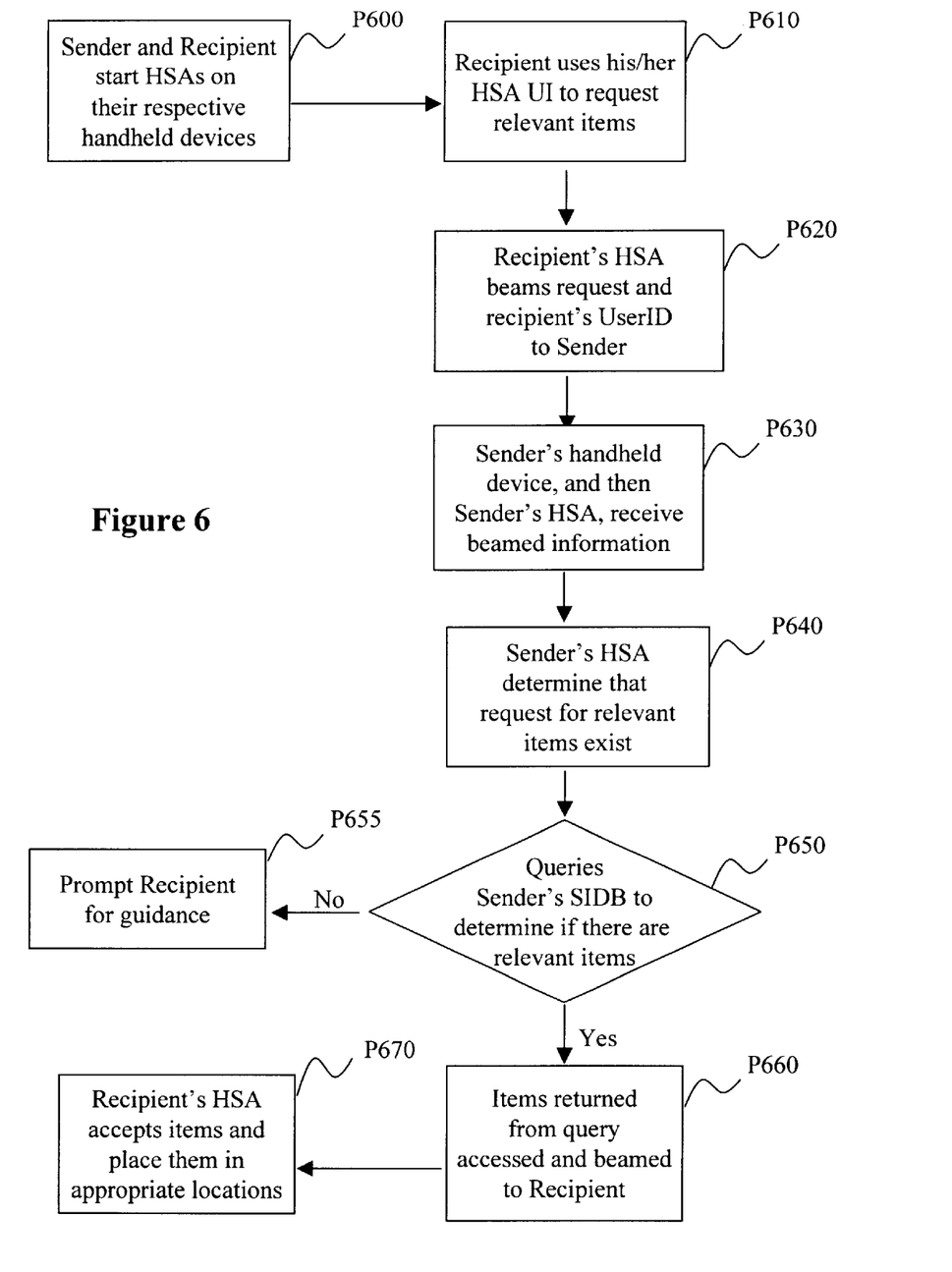
FIG. 6 illustrates processes for automatically sharing user-relevant information between handheld devices initiated by a recipient according to an embodiment of the present invention.

FIG. 6 illustrates processes for automatically sharing user-relevant information between handheld devices initiated by a recipient according to an embodiment of the present invention. In block P600, both users, a soon-to-be sender and the recipient, start the HSAs on their respective handheld devices. In another implementation, HSAs on handheld devices default to the "on" position, so users do no need to start the HSAs. In block P610, the recipient, or the person wishing to get a relevant item or a set of relevant items, uses the HSA UI to request the relevant item(s). After the request is entered through the HSA UI, the recipient's HSA beams the request along with the recipient's UserID to the handheld device soon-to-be sender, as shown in block P620. In block P630, the sender's handheld device receives the beamed information and passes the beamed information to the sender's HSA. Here, the sender is the person to whom the request was made. In block P640, the HSA of the sender receives and analyzes the beamed information to determine that it is a request for relevant items, along with the recipient's UserID.

In block P650, the HSA of the sender queries the sender's SIDB to determine if the sender has items relevant to the recipient's UserID. If a relevant item(s) exists, the item(s) returned as a result of the query is accessed and beamed to the recipient, as shown in block P660. In one implementation, each beamed item also includes information about its owner application and other attributes. For example, when a contact item is beamed, the owner could be the "Address Book" application, the location could be a record identifier, and the attributes could be the category for the item, the default field to display in the short view, etc. In another example, when a web page is beamed, the owner could be a specialized handheld browser application and the location could be a record identifier, without any attributes. On the other hand, if no relevant item exists, a message is beamed to the recipient to inform him/her of the fact, as shown in block P655. In this case, the message may also prompt the recipient for guidance. In block P670, the HSA of the recipient accepts the item(s) and attached information and places them in corresponding locations with the appropriate attributes on the handheld device of the recipient. In one embodiment, the HSA of the sender also beams out a portion of its SIDB corresponding to the beamed item(s), allowing the recipient's HSA to have sufficient information to automatically include these newly available items when acting as a sender next time.

Figure 7:
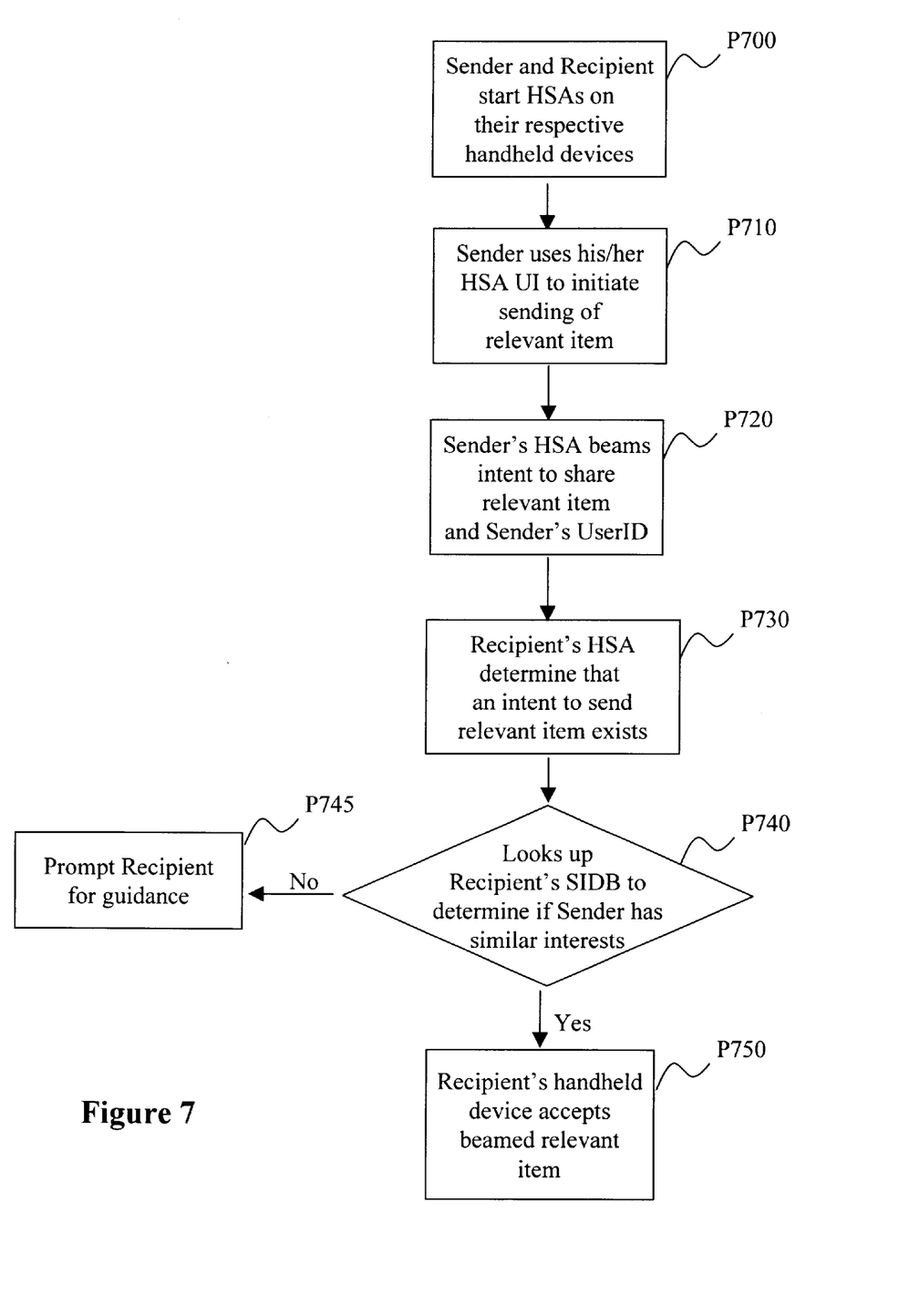
FIG. 7 illustrates processes for automatically sharing user-relevant information between handheld devices initiated by a sender according to an embodiment of the present invention.

FIG. 7 illustrates processes for automatically sharing user-relevant information between handheld devices initiated by a sender according to an embodiment of the present invention. In block P700, both users, the sender and a recipient, start the HSAs on their respective handheld devices. In another implementation, HSAs on the handheld devices default to the "on" position, so users do no need to start the HSAs. In block P710, the sender, or the person wishing to share a relevant item(s), uses the HSA UI to initiate the sending of the relevant item(s). In block P720, the sender's HSA beams the intent to share the relevant item along with the sender's user identification information, e.g., sender's UserID. In one implementation, the relevant item is also beamed and stored in a buffer area of the handheld device of the recipient. In block P730, the handheld device of the recipient receives the beamed data and passes it to the recipient's HSA. The recipient's HSA analyzes the beamed data to determine that it is an intent to send relevant items, along with the sender's UserID. In block P740, the HSA of the recipient looks up in the recipient's SIDB to determine if the sender has similar interests. In one implementation, the HSA of the recipient queries the recipient's SIDB using the sender's UserID. In block P750, if it is determined that the sender has similar interests as the recipient, the handheld device of the recipient accepts the beamed relevant item, which may, for example, be already stored in a buffer area of the handheld device or subsequently beamed to the recipient. On the other hand, if it is determined that the sender does not have similar interests as the recipient, or the sender does not meet the degree of similarity requirement as set forth by the recipient, the item is rejected, as shown in block P745. In another implementation, the recipient is prompted for guidance, allowing the recipient to have the option to manually reject the item or accept the item.

According to an embodiment of the present invention, instead of synchronizing a sharable item, a sharable note regarding the sharable item is instead sent, along with the list of users interested in the sharable item corresponding to the sharable note. The sharable note may, for example, include information pertaining to the descriptions and locations of the sharable item, which may, for example, be located in the computing device or another server. When a recipient or a sender initiates sharing for a sharable item that only has the sharable note synchronized, the handheld device of the sender makes a note of the desire of the recipient for the sharable item. A message is transferred from the sender to the recipient to indicate that the sharable item will be beamed after the handheld device of the sender synchronizes with the computing device of the sender (assuming that the sharable item is located in the computing device of the sender). During the next synchronization, the sharable item will be transferred from the computing device to the handheld device of the sender. This allows the sharable item to be transferred from the sender's handheld device to the receiver's handheld device. In one implementation, the sharable item is deleted from sender's handheld device after the transfer. This embodiment is likely to be utilized when the sharable item is large in size and the handheld device has limited storage capacity.

Embodiments of the present invention as set forth above allow users of handheld devices to automatically share user-relevant information between, or among, handheld devices. The present invention allows agents on computing devices to share interest profiles with others in a centralized location. From the centralized location, a list of users with similar interest profiles is obtained by the computing devices. The computing devices also mark sharable items for groups of users to whom the item is relevant, by considering their interest profiles and the nature of the items. The list and marked sharable items are gathered in share information databases. During synchronization between the computing devices and the handheld devices, each share information database is synchronized to its respect handheld device. The share information database allows automatic relevance-based sharing of items between handheld devices in a quick and efficient manner. By distributing the necessary operations, the computing device, such as a desktop computer, is used to do the bulk of the processing work, while the handheld device supports interface and other lightweight operations. Because the handheld devices do not need to deal with the centralized location and the agents in the computing devices to establish similar user information and share item information during the time of the actual sharing, little processing is needed on the handheld devices. Elaborate beaming protocol and customization of the native software applications on the handheld devices are also not required because the data to be beamed between a recipient and a sender remains simple. Since little processing capability is required, the present invention is able to work quickly and efficiently despite limited processing power of the handheld devices, limited nature of the existing beaming protocol, and limited customization of present native software applications on the handheld devices. Moreover, because automatic sharing is provided, users no longer have to personally keep track of all the items they carry on their handheld devices, or all of the items sharable, and remember to mention or offer them to others to whom they may be relevant.

While the description above refers to particular embodiments of the present invention, it will be understood that many modifications may be made without departing from the spirit thereof. For example, instead of carrying out synchronization between a computing device section and a handheld device section, synchronization is completed with a server broadcasting share information database to a handheld device, wherein the server builds the share information database containing the similar user information and share user information. Like a computing device, the broadcast server may be a server separated from the centralized location, but the server may also combine the functionality of both the centralized location and the computing devices. Moreover, the concepts and techniques disclosed herein also apply to future handheld devices with additional customization capabilities and/or more sophisticated wireless protocols, e.g., Bluetooth. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of automatically sharing user-relevant information between handheld devices, the method comprising:

storing interest profiles of a plurality of users of handheld devices in a centralized location, the centralized location allowing a user to share his/her profile with others;

obtaining from the centralized location a list of users with profiles similar to the profile of the user;

marking a sharable item of the user with users to whom the item is relevant;

synchronizing the list and the marked sharable items to the user's handheld device; and providing automatic relevance-based sharing of items, including the sharable item, between the handheld device of the user and another handheld device, wherein the sharing may be initiated by the handheld device of the user or the other handheld device.

2. The method of claim 1, wherein if the user is a recipient of a sharing session initiated by the other handheld device, a query is made into the synchronized list to see if the user of the other handheld device has similar interest.

3. The method of claim 1, wherein if the user is a sender of a sharing session initiated by the other handheld device, a query is made into the synchronized marked sharable items for items relevant to the user of the other handheld device.

4. The method of claim 1, wherein the handheld devices are systems with low processing power as compared to a personal computer.

5. The method of claim 1, further comprising providing a user interface mechanism on the user's handheld device that allows the user to initiate sharing either as a recipient or a sender.

6. The method of claim 1, further comprising providing a user interface front end to the list and the marked sharable items that allows the user to modify them, set their own list and marked sharable items, or set the rules for making the list and marked sharable items.

7. A system for automatic relevance-base sharing information between handheld devices, comprising:

a centralized location that stores interest profiles of a plurality of users of handheld devices;

a profile agent in a computing device that obtains from the centralized location a list of users with profiles similar to the profile of a user operating the computing device;

a sharing agent in the computer device that marks a sharable item of the user operating the computing device with users to whom the item is relevant;

a synchronizer that synchronizes the list and the marked sharable items to a first handheld device, which is a handheld device of the user operating the computing device; and logic embedded in the first handheld device that allows automatic relevance-based sharing of items, including the sharable item, between the first handheld device and a second handheld device, wherein if the user is a recipient of a sharing session initiated by the second handheld device, a query is made into the synchronized list to see if the user of the other handheld device has similar interest, and if the user is a sender of a sharing session initiated by the second handheld device, a query is made into the synchronized marked sharable items for items relevant to the user of the second handheld device.

8. The system of claim 7, wherein the computing device is a personal computer, and the handheld devices are personal digital assistants.

9. The system of claim 7, wherein the handheld devices are systems with low processing power.

10. The system of claim 7, further comprising user interface mechanisms on the first and second handheld devices that allows the user of the first handheld device or the user of the second handheld device to initiate sharing either as a recipient or a sender.

11. The system of claim 7, further comprising a share information database that includes the list and the marked sharable items, wherein the synchronizer synchronizes the share information database instead of the list and the marked sharable items, and the share information database includes an item table for storing type and location information of particular items, a similar user table for storing similar user information, and a item interest table for storing share item information.

12. The system of claim 11, wherein the synchronizer allows transfer of the share information database, or a portion thereof, from the first handheld device to the computing device.

13. The system of claim 12, further comprising a user interface front end to the share information database that allows the user operating the computing device to modify information stored in the share information database, set his/her own information, or set rules for the profile agent or the sharing agent.

14. An automatic handheld sharing method for a handheld device of a sender, the sharing between the handheld device and a handheld device of a recipient being initiated by the recipient, the method comprising:

receiving a beamed request for relevant items, along with the recipient's identification information;

querying a share information database in the handheld device of the sender for items relevant to the recipient using recipient's identification information, wherein the share information database includes sharable items on the handheld device of the sender, the sharable items being marked with users to whom the sharable items are relevant;

returning an item or set of items relevant to the recipient from the query; and beaming the relevant item to the handheld device of the recipient.

15. The method of claim 14, wherein the share information database is created in and synchronized from a computing device operated by the sender.

16. The method of claim 14, wherein the marked sharable items is included in an item interest table, the item interest table including an item identification field for denoting sharable items, a user identification field for denoting users to whom the sharable items are relevant, and an interest level field for indicating the interest level of the users in the sharable items.

17. The method of claim 14, further comprising beaming a portion of the share information database corresponding to the beamed item to the handheld device of the recipient.

18. An automatic handheld sharing method for a handheld device of a recipient, the sharing between the handheld device and a handheld device of a sender being initiated by the sender, the method comprising:

receiving an intent to beam relevant item from the handheld device of the sender;

receiving the sender's identification information along with the intent;

querying a share information database in the handheld device of the recipient to determine if the sender has similar interests using sender's identification information, wherein the share information database includes a list of users with profiles similar to the profile of the recipient; and accepting a subsequent item or set of items if it is determined that the sender has similar interests.

19. The method of claim 18, wherein the intent to beam relevant item is symbolized by a relevant item being received, the relevant item being the subsequent item accepted.

20. The method of claim 18, wherein the share information database is created in and synchronized from a computing device operated by the recipient.

21. The method of claim 18, further comprising receiving an intent to share relevant item from the handheld device of the sender, wherein the query is performed after the handheld device of the recipient receives and acknowledges such intent.

22. The method of claim 18, further comprising prompting the recipient for guidance if it is determined that the sender does not have similar interests.

23. The method of claim 18, wherein the list of users is included in a similar user table, the similar user table including a user identification field for denoting users with profiles similar to that of the recipient and a similarity score filed for indicating the degree of similarity between each user's profile and the recipient's profile.

24. A computer readable medium for use in conjunction with a handheld device of a sender for automatic sharing between the handheld device of the sender and a handheld device of a recipient, the sharing being initiated by the recipient, the computer readable medium including computer readable instructions encoded thereon for:

receiving a beamed request for relevant items, along with the recipient's identification information;

querying a share information database in the handheld device of the sender for items relevant to the recipient using recipient's identification information, wherein the share information database includes sharable items on the handheld device of the sender, the sharable items being marked with users to whom the sharable items are relevant;

returning an item relevant to the recipient from the query; and beaming the relevant item to the handheld device of the recipient.

25. The computer readable medium of claim 24, wherein the share information database is created in and synchronized from a computing device operated by the sender.

26. The computer readable medium of claim 24, wherein the marked sharable items is included in an item interest table, the item interest table including an item identification field for denoting sharable items, a user identification field for denoting users to whom the sharable items are relevant, and an interest level field for indicating the interest level of the users in the sharable items.

27. The computer readable medium of claim 24, further comprising computer readable instruction encoded thereon for beaming a portion of the share information database corresponding to the beamed item to the handheld device of the recipient.

28. A computer readable medium for use in conjunction with a handheld device of a recipient for automatic sharing between a handheld device of a sender and the handheld device of the recipient, the sharing being initiated by the sender, the computer readable medium including computer readable instructions encoded thereon for:

receiving a relevant item beamed from the handheld device of the sender;

receiving the sender's identification information along with the relevant item;

querying a share information database in the handheld device of the recipient to determine if the sender has similar interests using sender's identification information, wherein the share information database includes a list of users with profiles similar to the profile of the recipient; and accepting the relevant item if it is determined that the sender has similar interests.

29. The computer readable medium of claim 28, wherein the share information database is created in and synchronized from a computing device operated by the recipient.

30. The computer readable medium of claim 28, further comprising computer readable instruction encoded thereon for receiving an intent to share relevant item from the handheld device of the sender, wherein the query is performed after the handheld device of the recipient receives and acknowledges such intent.

31. The computer readable medium of claim 28, further comprising computer readable instruction encoded thereon for prompting the recipient for guidance if it is determined that the sender does not have similar interests.

32. The computer readable medium of claim 28, wherein the list of users is included in a similar user table, the similar user table including a user identification field for denoting users with profiles similar to that of the recipient and a similarity score filed for indicating the degree of similarity between each user's profile and the recipient's profile.

33. A centralized location to be utilized for automatic relevance-base sharing between handheld devices, comprising:

a users and profiles database for storing user information and user profiles;

a profile similarity analyzer for analyzing and marking user profiles that are similar; and functionality for updating and extracting information from the users and profiles database, wherein the functionality for updating and extracting information receives a user profile from a computing device and returns, to the computing device, a list of centralized location users who have profiles similar to the user profile.

34. The centralized location of claim 33, wherein the functionality for updating and extracting information also returns profile information of the centralized location users with similar profiles.

35. The centralized location of claim 33, wherein the functionality for updating and extracting information also receives an item, or a set of items, from the computing device and returns, to the computing device, a list of users to whom the item, or a set of items, is relevant.

36. The centralized location of claim 33, wherein the functionality for updating and extracting information including a user request handler, an update user profile portion, a get similar profile portion.

37. The centralized location of claim 35, wherein the functionality for updating and extracting information also includes a get relevant users portion.

* * * * *